United States Patent
Shibao et al.

(10) Patent No.: US 9,981,611 B2
(45) Date of Patent: May 29, 2018

(54) VEHICLE STORAGE ASSEMBLY

(71) Applicant: FORD GLOBAL TECHNOLOGIES, LLC, Dearborn, MI (US)

(72) Inventors: Fu Shibao, Nanjing (CN); Jin Xuezhi, Nanjing (CN); Shen Jinyun, Nanjing (CN); Xu Wei, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 15/240,272

(22) Filed: Aug. 18, 2016

(65) Prior Publication Data
US 2017/0057417 A1    Mar. 2, 2017

(30) Foreign Application Priority Data
Aug. 28, 2015   (CN) .......................... 2015 1 0544069

(51) Int. Cl.
*B60R 13/00*   (2006.01)
*B60R 7/04*   (2006.01)

(52) U.S. Cl.
CPC ..................... *B60R 7/04* (2013.01)

(58) Field of Classification Search
CPC ............... C08F 210/06; C08F 2500/17; C08F 2500/20; C08F 210/00; C08L 2666/06; H01L 2924/00; H01L 2224/743; H04Q 11/0478; C12Q 1/6811; G06F 5/14
USPC ...................................................... 296/24.34
See application file for complete search history.

(56) References Cited

U.S. PATENT DOCUMENTS

| | | | | |
|---|---|---|---|---|
| 5,072,989 A | * | 12/1991 | Spykerman | A47C 7/62 296/37.8 |
| 5,187,744 A | * | 2/1993 | Richter | B60R 11/0241 224/553 |
| 5,205,452 A | * | 4/1993 | Mankey | B60R 7/043 224/275 |
| 5,248,183 A | * | 9/1993 | Gignac | B60N 3/102 248/311.2 |

(Continued)

FOREIGN PATENT DOCUMENTS

| CN | 104228649 A | 12/2014 |
|---|---|---|
| CN | 203995853 U | 12/2014 |

(Continued)

OTHER PUBLICATIONS

English Machine Translation of CN104228649A.
(Continued)

*Primary Examiner* — Kiran B Patel
(74) *Attorney, Agent, or Firm* — Vichit Chea King & Schickli, PLLC (57) ABSTRACT

A vehicle storage assembly is provided to store an item. The vehicle storage assembly includes: (1) a housing having a first floor and a first wall extending therefrom, the first floor and the first wall together defining a first cavity extending along a depth direction; (2) a first track supported on the housing and extending along a longitudinal direction; and (3) a first block supported on the first track and at least partially received within the first cavity, where the first block is to support the item at first and second item positions spaced apart along the depth direction when the first block is respectively at first and second block positions spaced apart along the longitudinal direction.

14 Claims, 5 Drawing Sheets

(56) References Cited

U.S. PATENT DOCUMENTS

| | | | | |
|---|---|---|---|---|
| 5,284,314 | A * | 2/1994 | Misaras | B60N 2/4686 224/549 |
| 5,601,269 | A * | 2/1997 | Jankovic | B60N 3/102 224/281 |
| 5,876,007 | A * | 3/1999 | Lancaster | B60N 3/102 224/281 |
| 6,206,260 | B1 * | 3/2001 | Covell | B60N 3/083 206/5 |
| 6,464,187 | B1 * | 10/2002 | Bieck | B60N 3/102 224/926 |
| 6,942,267 | B1 * | 9/2005 | Sturt | B60N 3/102 248/311.2 |
| 7,029,048 | B1 * | 4/2006 | Hicks | B60N 3/101 296/193.04 |
| 7,168,669 | B2 | 1/2007 | Park | |
| 7,341,297 | B2 * | 3/2008 | Nakamura | B60N 3/083 224/926 |
| 7,401,755 | B2 * | 7/2008 | Wu | H05K 5/0204 248/222.51 |
| 7,513,553 | B2 * | 4/2009 | Singh | B60N 3/08 296/37.8 |
| 7,731,254 | B2 * | 6/2010 | Lota | B60R 7/04 248/311.2 |
| 7,806,451 | B2 * | 10/2010 | Lota | B60R 7/04 296/24.34 |
| 8,172,294 | B1 * | 5/2012 | Hooton | B60N 3/101 220/738 |
| 8,480,151 | B2 * | 7/2013 | Gaudig | B60N 3/105 296/24.34 |
| 8,517,447 | B2 * | 8/2013 | Biggs | B60R 7/04 296/24.34 |
| 8,714,613 | B1 * | 5/2014 | Gillis | B60R 7/04 296/24.34 |
| 8,783,635 | B2 * | 7/2014 | Kamiya | B60N 3/101 224/282 |
| 8,833,716 | B2 * | 9/2014 | Funk | F16M 13/02 248/309.1 |
| 9,211,828 | B2 * | 12/2015 | Masuda | B60N 3/102 |
| 9,428,092 | B2 * | 8/2016 | Bosma | B60N 3/103 |
| 9,561,745 | B2 * | 2/2017 | Sawada | B60N 3/10 |
| 9,862,296 | B2 * | 1/2018 | Parlow | B60N 3/103 |
| 2001/0020620 | A1 * | 9/2001 | Katagiri | B60R 7/04 220/345.2 |
| 2002/0089203 | A1 * | 7/2002 | Flowerday | B60N 3/08 296/37.8 |
| 2003/0094557 | A1 * | 5/2003 | Takahashi | B60N 2/0224 248/311.2 |
| 2003/0127877 | A1 * | 7/2003 | Luginbill | B60N 2/4646 296/37.8 |
| 2003/0155786 | A1 * | 8/2003 | Kim | B60R 7/04 296/24.34 |
| 2004/0080173 | A1 * | 4/2004 | Niwa | B60N 2/4646 296/24.34 |
| 2005/0072889 | A1 * | 4/2005 | Park | B60N 3/101 248/311.2 |
| 2006/0237611 | A1 * | 10/2006 | Sturt | B60N 3/106 248/311.2 |
| 2006/0237612 | A1 * | 10/2006 | Thomas | B60R 7/04 248/311.2 |
| 2007/0075558 | A1 * | 4/2007 | Kim | B60N 2/4686 296/24.34 |
| 2007/0152461 | A1 * | 7/2007 | Joler | B60R 7/04 296/24.34 |
| 2007/0182183 | A1 * | 8/2007 | Lota | B60R 7/04 296/24.34 |
| 2012/0261935 | A1 * | 10/2012 | Perez | B60R 5/04 296/24.4 |
| 2015/0151661 | A1 * | 6/2015 | Morel | B60R 7/04 296/37.1 |
| 2016/0101718 | A1 * | 4/2016 | Bohlke | B60N 3/106 296/37.8 |

FOREIGN PATENT DOCUMENTS

| | | |
|---|---|---|
| DE | 102012221398 A1 | 5/2013 |
| KR | 20150039281 A | 4/2015 |

OTHER PUBLICATIONS

English Machine Translation of DE102012221398A1.
English Machine Translation of CN203995853U.
English Machine Translation of KR20150039281A.

* cited by examiner

VEHICLE STORAGE ASSEMBLY

TECHNICAL FIELD

The document relates to a vehicle storage assembly to store an item.

BACKGROUND

Automotive interiors often feature a number of storage compartments, such as a cup holder positioned at the rear seat armrest or the console. U.S. Pat. No. 7,168,669 B2 discloses a vehicle beverage container holder with a holding member. The holding member may move within the container holder to position beverage containers with various diameters.

SUMMARY

According to one or more embodiments, a vehicle storage assembly is provided to store an item. The vehicle storage assembly includes a housing including a first floor and a first wall extending therefrom. The first floor and the first wall together define a first cavity extending along a depth direction. The vehicle storage assembly also includes a first track supported on the housing and extending along a longitudinal direction and a first block supported on the first track and at least partially received within the first cavity, where the first block is to support the item at first and second item positions spaced apart along the depth direction when the first block is respectively at first and second block positions spaced apart along the longitudinal direction.

The first block may include a first support surface to support the item. The first support surface may include first and second points spaced apart along the longitudinal direction and differing in distance relative to the first floor.

The first block may further include a second support surface spaced apart from the first support surface along the longitudinal direction. The second support surface may include third and fourth points spaced part along the longitudinal direction and differing in distance relative to the first floor.

The first track may contact the first floor.

The housing may further include a second floor and a second wall extending therefrom. The second floor and the second wall together may define a second cavity spaced apart from the first cavity along the depth direction.

The vehicle storage assembly may further include a telescopic table at least partially received within the second cavity, such that the first block elevates and descends along the depth direction via its connection to the telescopic table.

The vehicle storage assembly may further include a locking unit to releasably lock the first block at a given position, the locking unit being at least partially received within the second cavity.

The locking unit may include a first mating track, such that the first block is locked at the give position when the first track engages the first mating track.

The vehicle storage assembly may further include a second track supported on and contacting the first wall, and a transverse bar contacting and movable relative to the second track to provide positioning of the item.

The second track may include first and second tracking parts contacting first and second wall parts of the first wall, respectively, such that the transverse bar contacts both the first and second tracking parts when positioning the item.

The first cavity may include a first end portion and a second end portion spaced apart from the first end portion along the longitudinal direction, the first end portion differing from the second end portion in opening dimension.

The first block may include a pair of first blocks spaced apart along the longitudinal direction and movable along the first track.

The first track may be supported on and contact the first wall.

The first track may include first and second block pockets spaced apart along the longitudinal direction and extending along the depth direction, such that the first and second block pockets correspond to the first and second block positions.

One or more advantageous features as described herein will be readily apparent from the following detailed description of one or more embodiments when taken in connection with the accompanying drawings.

BRIEF DESCRIPTION OF THE DRAWING FIGURES

For a more complete understanding of one or more embodiments of the vehicle storage assembly, reference is now made to the one or more embodiments illustrated in greater detail in the accompanying drawings and described below wherein.

DETAILED DESCRIPTION

As referenced in the FIG.s, the same reference numerals may be used to refer to the same parameters and components or their similar modifications and alternatives. These specific parameters and components are included as examples and are not meant to be limiting. The drawings referenced herein are schematic and associated views thereof are not necessarily drawn to scale.

Because of packaging requirements in modern vehicles, it is desirable to provide a vehicle storage assembly suitable for items of various sizes such as beverage containers of different heights or diameters and also to prevent vibrations thereof.

As detailed herein elsewhere, a vehicle storage assembly is provided to advantageously accommodate storage of items of different sizes and thereby realize efficient use of vehicle interior space. In particular, a first block is provided to support items at different positions spaced apart along a height direction, such that items with different heights may be positioned in the storage assembly with enhanced ease for their retrieval.

FIG. 1A through FIG. 7B illustratively depict various views of a vehicle storage assembly 100 according to one or more embodiments. The storage assembly 100 includes: a housing 390 including a first floor 320 and a first wall 214 extending therefrom, the first floor 320 and the first wall 214 together defining a first cavity 210 extending along a depth direction "D"; a first track 230 supported on the housing 390 and extending along a longitudinal direction "L"; and a first block 370 supported on the first track 230 and to be at least partially received within the first cavity 210, where the first block 370 is to support the item 380 at a first item position Q1 and a second item position Q2 spaced apart along the depth direction "D" when the first block 370 is respectively at a first block position P1 and a second block position P2 spaced apart along the longitudinal direction "L".

Referring back to FIG. 2, FIG. 3A and FIG. 3B, by extending from the first floor 320, the first wall 214 does not need to be in seamless connection to or be an extension from the first floor 320. In certain embodiments, the first wall 214 may be in discontinuous connection with the first floor 320, or in certain other embodiments not be in direct contact with the first floor 320. The latter may be realized when the first wall 214 and the first floor 320 are each independently supported on or a part of the housing 390, and therefore the first wall 214 and the first floor 320 may define the first cavity 210 without necessarily having to directly contact each other.

Referring back again to FIG. 2, FIG. 3A and FIG. 3B, the first cavity 210 may be formed as a hollow space with an opening at its top, such that a user may place the item-to-be-stored 380 such as a beverage container into the first cavity 210 through the opening.

For purpose of illustration, the storage assembly 100 is shown as positioned at the floor console in the description and associated drawings mentioned herein. In another one or more embodiments, the storage assembly 100 may be positioned at other locations of the vehicles, including but not limited to the rear seat central console, the control panel, and vehicle seats.

Figure 1A:
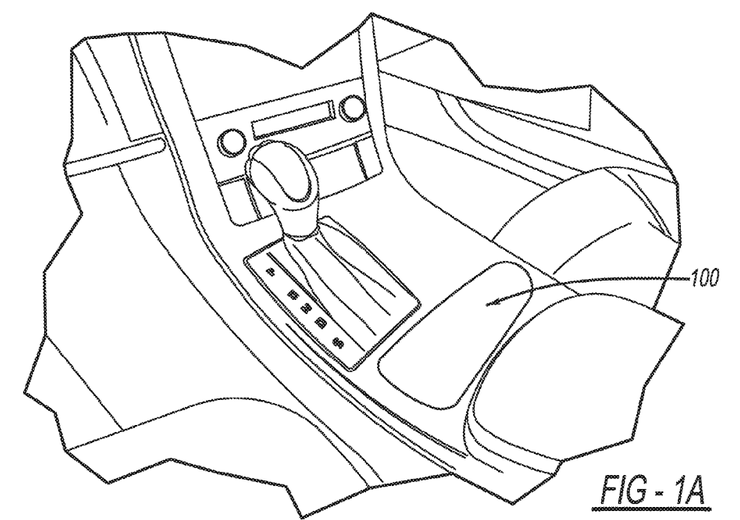
FIG. 1A illustratively depicts a vehicle storage assembly as positioned relative to a vehicle interior according to one embodiment of the present invention.
Figure 1B:
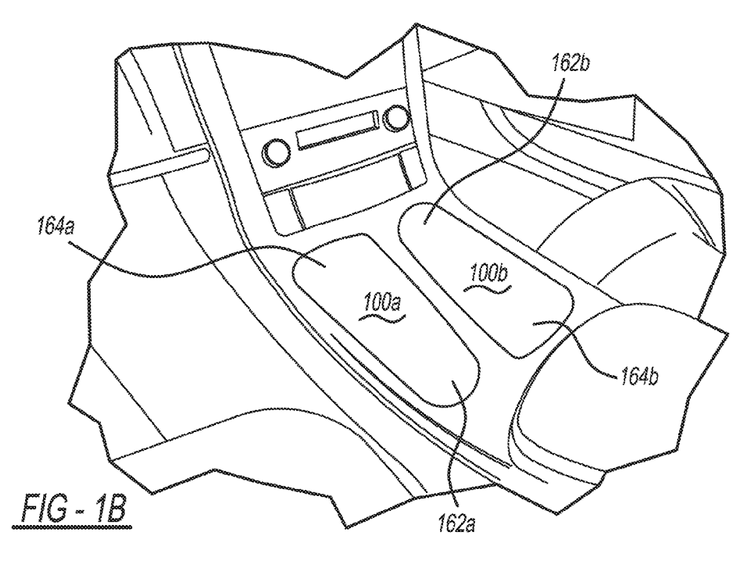
FIG. 1B illustratively depicts a vehicle storage assembly as positioned relative to a vehicle interior according to another embodiment of the present invention.

Furthermore, although the storage assembly 100 is illustratively depicted in FIG. 1A as being positioned at the central console along a transverse direction, two storage assemblies 100a, 100b are illustratively depicted in FIG. 1B as being positioned side-by-side to take full advantage of their respective complementary end portions with different sizes to better utilize the space available. In another one or more embodiments, more or fewer storage assemblies may be positioned similarly or in other arrangements according to the space available or the requirements in packaging.

Referring back to FIG. 1B, two storage assemblies 100a, 100b are positioned side-by-side. In particular, the storage assembly 100a has a first end portion 162a with a relatively smaller opening size and a second end portion 164a with a relatively bigger opening size, and the storage assembly 100b has a first end portion 162b with a relatively smaller opening size and a second end portion 164b with a relatively bigger opening size. The first end portion 162a of the storage assembly 100a is adjacent to the second end portion 164b of the storage assembly 100b, and the second end portion 164a of the storage assembly 100a is adjacent to the first end portion 162b of the storage assembly 100b. By way of such an arrangement, otherwise limited space at the floor console may be utilized relatively more effectively, and the driver and front row passenger may independently be provided with enhanced options to store items with different sizes.

Figure 2:
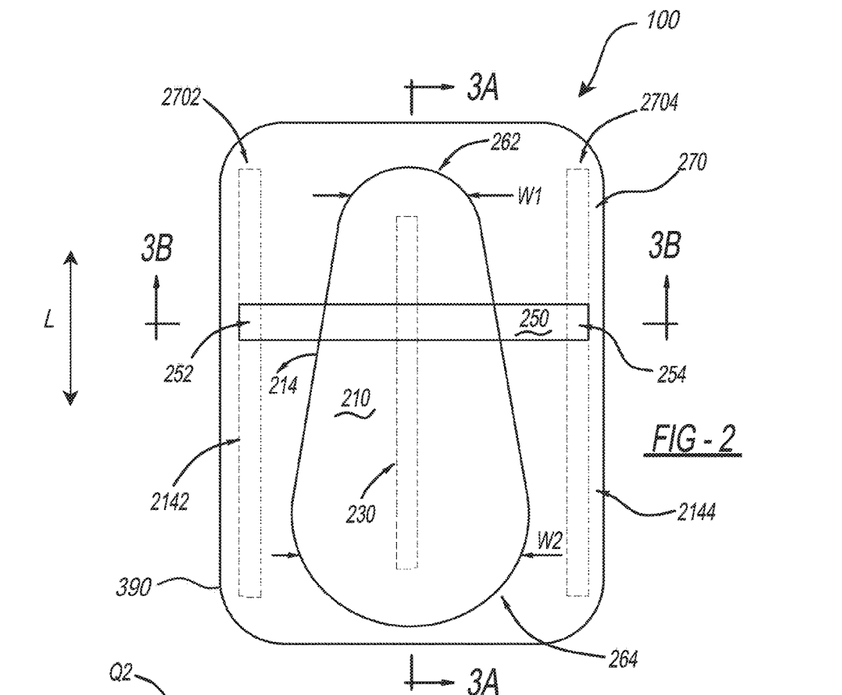
FIG. 2 illustratively depicts a top-down view of the storage assembly referenced in FIG. 1A.

In the embodiment as illustratively depicted in FIG. 2, the first cavity 210 may include a first end portion 262, and a second end portion 264 spaced apart from the first end portion 262 along the longitudinal direction L. The first end portion 262 is with an opening dimension W1 which differs from an opening dimension W2 of the second end portion 264. It is particularly advantageous in that the user may place beverage containers with different diameters at the first end portion 262, second end portion 264, or any suitable positions there-between. For instance, a glass with 50 mm (millimeters) diameter may be placed at the first end portion 262, because the first end portion 262 has a relatively small opening dimension W1 and greater stabilization may be realized for the glass with reduced likelihood of vibrations when the glass is positioned in the first cavity 210. For instance also, a soda bottle with an 80 mm diameter may be placed at the second end portion 264 which is of a relatively larger opening dimension W2. Although the first end portion 262 and the second end portion 264 are depicted as with an arc in FIG. 2, in other embodiments, other shapes may be adopted, such as shapes including two sides at an angle to each other, in response to space available and requirements in packaging.

Referring back to FIG. 2 through FIG. 3B, and in one or more embodiments, the storage assembly 100 may further include the first track 230 and the first block 370. The first track 230 is supported on the housing 390 and extends along the longitudinal direction L. In one non-limiting embodiment, and as illustratively depicted in FIG. 3A and FIG. 3B, the first track 230 may be formed as an elongated channel supported on the first floor 320 and extending along its thickness, and the first block 370 may contact and be slidable along the first track 230. In another non-limiting embodiment, the first block 370 may include a leg 310 and a support 315 connected to the leg 310 and positioned at least partially within the first cavity 210. The leg 310 may be supported on the first track 230. In certain instances, the leg 310 may extend through the first track 230 and slide along the first track 230, such that the first block 370 may move between any two positions, such as between positions P1 and P2, spaced apart along the longitudinal direction L. Accordingly, the support 315 may be selectively placed between the first floor 320 and the item-to-be-stored 380, such that the item-to-be-stored 380 may be supported at different item positions. For instance, in one or more embodiments and as illustratively depicted in FIG. 3A, the item 380 may be supported at a first item position Q1 when the first block 370 is at the first block position P1, and the item 380 may be supported at a second item position Q2 spaced apart from the first item position Q1 along the depth direction D when the first block 370 is at the second block position P2 spaced apart from the first block position P1 along the longitudinal direction L.

Figure 3A:
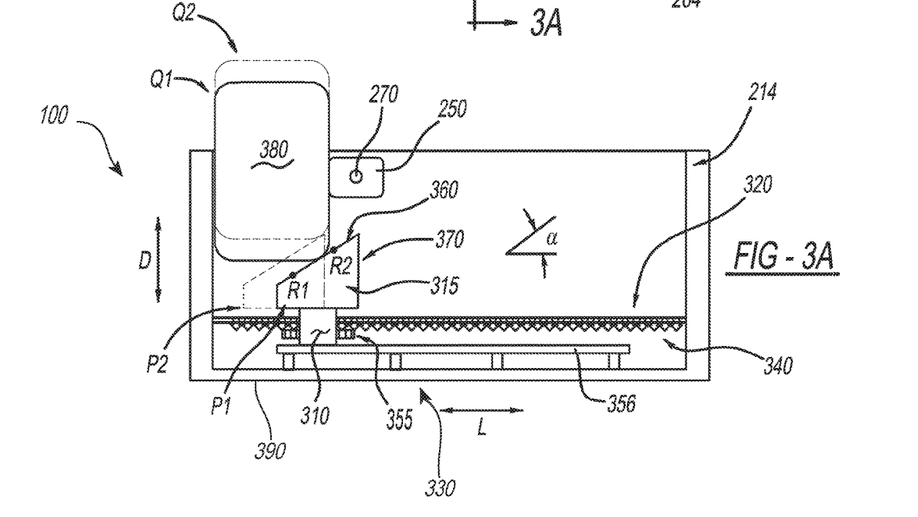
FIG. 3A illustratively depicts a cross-sectional view of the storage assembly referenced in FIG. 2, taken along line 3A-3A.
Figures 3B, 4:
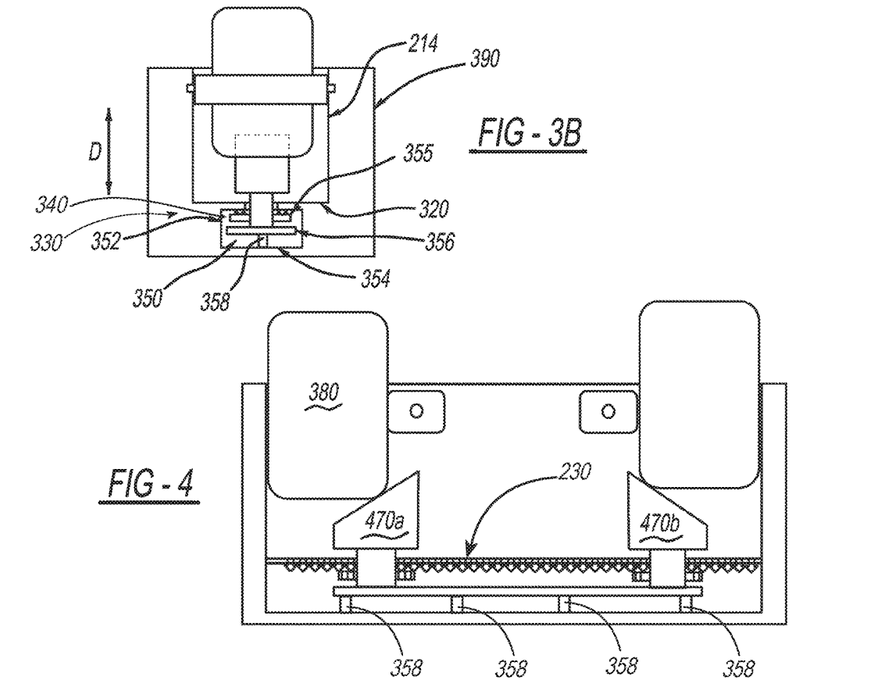
FIG. 3B illustratively depicts a cross-sectional view of the storage assembly referenced in FIG. 2, taken along line 3B-3B.
FIG. 4 illustratively depicts a view of an alternative of the storage assembly referenced in FIG. 3A.

As illustratively depicted in FIG. 3B, the first floor 320 is of a perimeter dimension smaller than a perimeter dimension of the housing 390. Stated alternatively, the first floor 320 is partially covering an available open space of the housing 390. This may be beneficial in making readily available access to structures further down below the first floor 320. It is to be appreciated that when desirable the first floor 320 may be configured to cover a greater percentage of the available open space of the housing 390.

With this structure, the user may place items of different heights within the storage assembly 100 or adjust the depth position of a given item. For instance, the user may move the first block 370 to the first block position P1 when the user wants to place a tall item such as a soda bottle. Accordingly, the item may be supported at the first item position Q1 via the first block 370 and may contact the first wall 214. Furthermore, and as described herein elsewhere, one or more transverse bars 250 may be provided to provide additional clamping or holding along the longitudinal direction L. Moreover, when the user needs to place a short item such as a short glass, the top rim may be lower than the top edge of the first wall 214, which may impart difficulties in retrieving the glass. In this situation, the first block 370 may be moved to the second block position P2 so that the item 380 may be supported at the second item position Q2. Because the second item position Q2 may be spaced apart from the first item position Q1 along the depth direction D, for instance according to the embodiment illustratively reflected in FIG. 3A, the second item position Q2 is higher than the first item position Q1, the top rim of the glass may extend above the top edge of the first wall 214, such that the glass may be retrieved from the storage assembly 100 with enhanced ease.

In one or more embodiments, and as illustratively depicted in FIG. 3A, the first block 370 may include a first support surface 360 to support the item 380. The first support surface 360 may include a first point R1 and a second point R2. The first and second points R1, R2 may be spaced apart from each other along the longitudinal direction L, and may differ in distance relative to the first floor 320. Similarly, the first support surface 360 may be of a non-uniform clearance relative to the first floor 320 along the longitudinal direction L. Accordingly, since the first block 370 may be of various positions relative to the first track 230, the item 380 may then be supported at variable heights, providing the user with greater ease in placing items with different heights.

It is to be appreciated that the first support surface 360 of the first block 370 may be substantially parallel to the first floor 320, or at an angle α defined between line R1-R2 of the first support surface 360 relative to the first floor 320 that is no greater than 30 degrees, 20 degrees, 10 degrees, or 5 degrees. Accordingly, the user may selectively place the first block 370 between the item-to-be-stored 380 and the first floor 320 as needed to adjust the height of the item 380 relative to the first floor 320. For instance, when an item-to-be-stored 380 is with a relatively greater height, the user may move the first block 370 along the longitudinal direction L to be away from the item, such that the item may be directly supported on the first floor 320 at a lower height position. For instance also, when an item-to-be-stored is with a relatively smaller height, the user may move the first block 370 toward and below the item-to-be-stored, such that the item may be supported on the first support surface 360 of the first block 370 at a higher height position. Similarly, the angle α defined by the line R1-R2 of the first support surface 360 relative to the first floor 320 may be no greater than 30 degrees, 20 degrees, 10 degrees, or 5 degrees. Thus, items may be supported at different positions along the depth direction D.

In another one or more embodiments, and as illustratively depicted in FIG. 4, the storage assembly 100 may include first blocks 470a, 470b in a pair. The pair of first blocks 470a, 470b may be spaced apart from each other along the longitudinal direction L, and may move along the first track 230. Accordingly, at least two items may both at the same time be supported with different height or adjustable height in the storage assembly 100.

Figure 5:
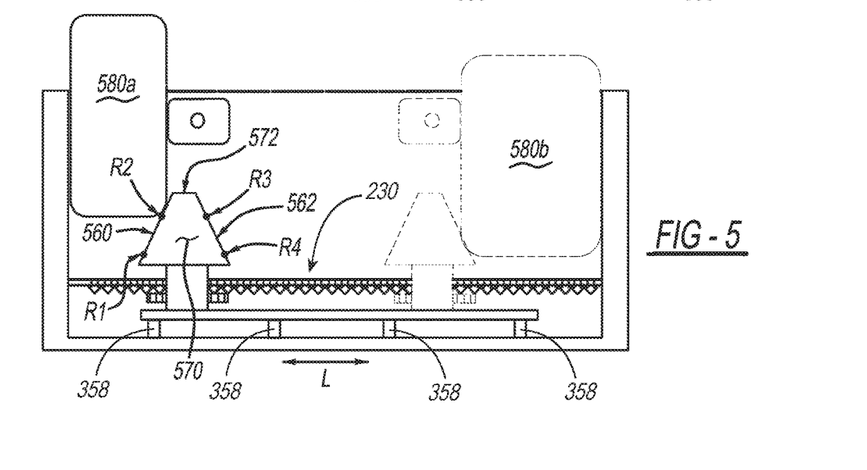
FIG. 5 illustratively depicts a view of another alternative of the storage assembly referenced in FIG. 3A.

In yet another one or more embodiments, and as illustratively depicted in FIG. 5, a first block 570 may further include a second support surface 562. The second support surface 562 may be spaced apart from a first support surface 560 along the longitudinal direction L, and the second support surface 562 may include a third point R3 and a fourth point R4 spaced part from each other along the longitudinal direction L. As illustratively depicted in FIG. 5, similar to the first point R1 and second point R2, the third and fourth points R3, R4 may differ in distance relative to the first floor 320. As shown in FIG. 5 in solid lines and dash lines separately, such configuration is particularly advantageous since only one single first block 570 may be needed to support item 580a or 580b at different positions via the movement of the first block 570 along the first track 230, thereby reducing material cost. It is to be appreciated that the first support surface 560 and the second support surface 562 are illustratively depicted in FIG. 5 as being connected to each other through a transition surface 572 positioned therebetween, which may be of any suitable shape, dimension and angle relative to the first or second support surface 560, 562. Similarly, the first block 570 is illustratively depicted as being of an isosceles trapezoid in cross-section. In certain embodiments, the transition surface 572 may be eliminated all-together such that the first support surface 560 may contact and extend directly from the second support surface 562.

Referring back to FIGS. 3A and 3B, and in one or more embodiments, the housing 390 may further include a second floor 354 and a second wall 352 extending upwardly therefrom. Accordingly, the second floor 354 and the second wall 352 may together define a second cavity 350, which may be spaced apart from the first cavity 210 along the depth direction D. A support or telescopic table 356 may be at least partially received within the second cavity 350. As illustratively depicted in FIGs, the support table 356 may be connected to the second floor 354 via one or more telescopic devices 358. Non-limiting examples of the telescopic devices 358 may include spring, damper, and elastic rubber. Similarly, although four telescopic devices 358 are shown in several FIGs, more or fewer telescopic devices 358 may be provided as necessary in other embodiments. The first block 370 may elevate and descend along the depth direction D via its connection to the telescopic devices 358 and in particular via the leg 310 and its contact with the support table 356.

Furthermore, and in one or more embodiments, the vehicle storage assembly 100 may further include a locking unit 330 to releasably lock the first block 370 at a given position, where the locking unit 330 may at least be partially received within the second cavity 350. In one embodiment, the locking unit 330 may be of the form as illustratively depicted in FIGS. 3A and 3B. In particular, the locking unit 330 may include a first mating track 340 and a first mating block 355. The first mating track 340 and the first mating block 355 may each have teeth structures engaged with each other. Accordingly, when the first block 370 needs to be moved from the first block position P1 to the second block position P2, the first block 370 may be pushed downward toward the support table 356 and the telescopic device 358 is compressed, such that the first mating block 355 may disengage the first mating track 340 and the first block 370 may then move along the first track 230. Once the first block 370 has been moved to the second block position P2 along the longitudinal direction L, the downward force exerted onto the first block 370 may be withdrawn. Therefore, the first mating block 355 may move upward from the support table 356 during recovery, and then engage again the first mating track 340, such that the first block 370 may be locked at the second block position P2.

With further reference to FIG. 2, as described herein elsewhere, the storage assembly 100 may include a second track 270 and a transverse bar 250 contacting the second track 270. The second track 270 may be supported on and contact the first wall 214. For instance, the second track 270 may be formed as an elongated channel on the first wall 214. Or, it may be as a separate part attached to the first wall 214 when suitable. The transverse bar 250 may contact the second track 270 and be movable relative to the second track 270. Accordingly, the user may move the transverse bar 250 as needed to contact the item 380, providing enhanced holding of the item 380. Thus, the item 380 may be held robustly by the first end portion 262, the first block 370, and the transverse bar 250, collectively.

Furthermore, the first wall 214 may include a first wall part 2142 and a second wall part 2144, and the second track 270 may include a first track part 2702 contacting the first wall part 2142 and a second track part 2704 contacting the second wall part 2144. Accordingly, and when the item 380 is to be positioned or secured, the transverse bar 250 may contact the first track part 2702 and the second track part 2704 so as to provide a relatively more robust holding structure. In one or more embodiments, two ends 252, 254 of the transverse bar 250 may respectively be received inside of and slidable along the first track part 2702 and the second track part 2704. As mentioned herein, another or more transverse bar 250 may be employed such that the item 380 may be positioned between the two transverse bars 250 along the longitudinal direction L to be further stabilized.

Figure 6A:
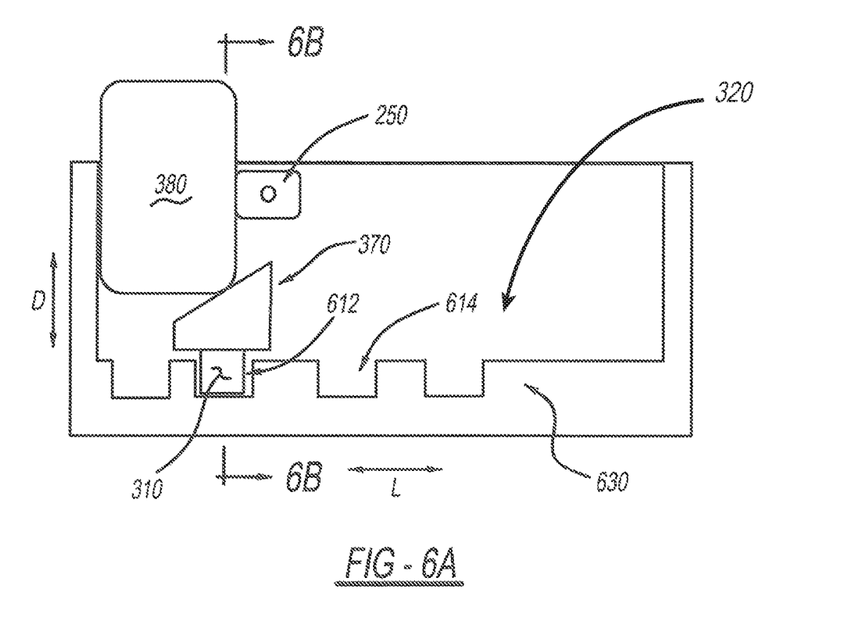
FIGS. 6A and 6B each illustratively depict a view of yet another alternative of the storage assembly referenced in FIG. 3A.
Figure 6B:
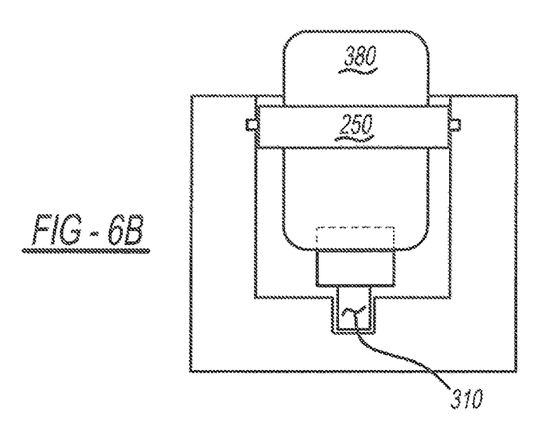

Referring now to FIGS. 6A and 6B, and according to an alternative embodiment, a variation of the first track and the first block is illustratively depicted. A first track 630 may include at least a first block pocket 612 and a second block pocket 614 spaced apart from each other along the longitudinal direction L and extending along the depth direction independently. In one or more instances, the first block pocket 612 and/or the second block pocket 614 may be formed as two recesses on the first floor 320. Also, the first and second block pockets 612, 614 may respectively correspond to the first and second block positions P1, P2. The first and second block pockets 612, 614 may each be formed to match the size and shape of the leg 310 of the first block 370. Accordingly, the leg 310 may be inserted into the first block pocket 612 when the first block 370 is to be placed at the first block position P1, and may be inserted into the second block pocket 614 when the first block 370 is to be placed at the second block position P2. Also, the orientation of the first block 370 may be adjusted such that it may support the item placed at the first end portion 262 and the second end portion 264 of the storage assembly 100 as described herein elsewhere. In other embodiments, more or fewer block pockets and/or first blocks may be employed for suitable support. Such configuration is particularly advantageous due to simplified structure and resistance to breakage.

Figure 7A:
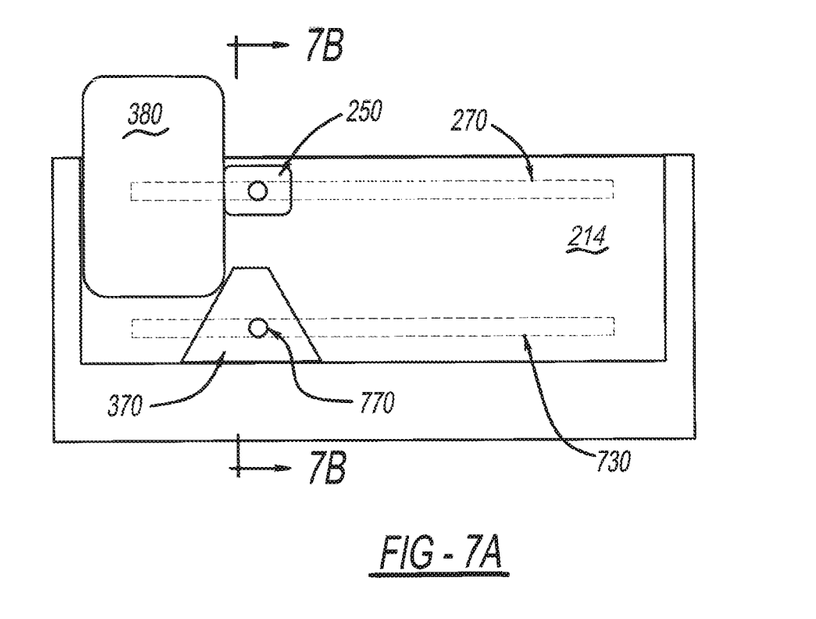
FIGS. 7A and 7B each illustratively depict a view of yet another alternative of the storage assembly as referenced in FIG. 3A.
Figure 7B:
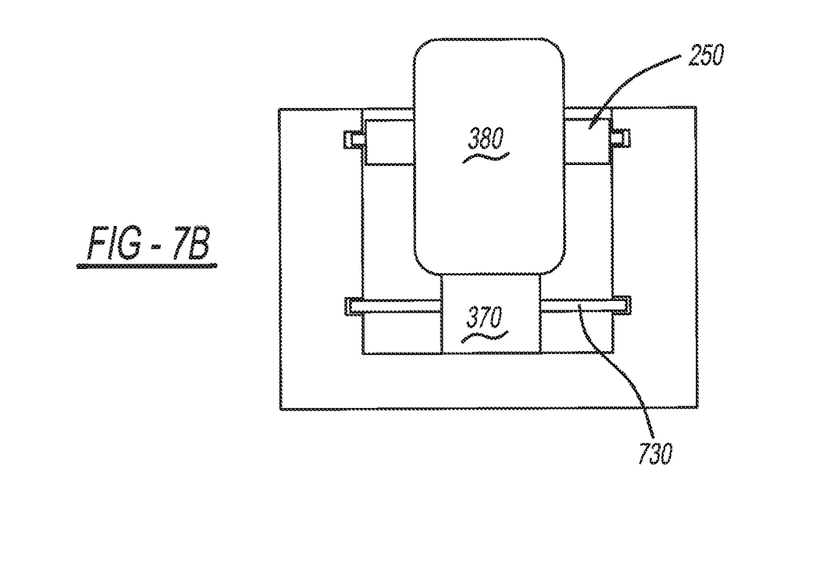

Referring now to FIGS. 7A and 7B, a yet alternative embodiment of the first track and the first block is illustratively depicted. A first track 730 is supported on and contacts the first wall 214. Accordingly, the first block 370 may include a shaft 770 formed integrally or via attachment to the first block 370. The shaft 770 may slide along the first track 730, thereby moving the first block 370 at least between the first block position P1 and the second block position P2. In other embodiments, more or fewer first blocks may be employed for tailored support. Such configuration is particularly advantageous due to its relatively simple structures and being independent of a need for many pockets defined in the housing 390 of the storage assembly 100.

In one or more embodiments, a vehicle storage assembly is provided to store an item. One skilled in the art will readily recognize from such discussion, and from the accompanying drawings and claims that various changes, modifications and variations can be made therein without departing from the true spirit and fair scope of the vehicle storage assembly as defined by the following claims.

What is claimed:

1. A vehicle storage assembly to store an item, comprising:
   a housing including a first floor and a first wall extending therefrom, the first floor and the first wall together defining a first cavity extending along a depth direction;
   a first track supported on the housing and extending along a longitudinal direction; and
   a first block supported on the first track and to be at least partially received within the first cavity, wherein the first block is to support the item at a first item position and a second item position spaced apart along the depth direction when the first block is respectively at a first block position and a second block position spaced apart along the longitudinal direction.

2. The vehicle storage assembly of claim 1, wherein the first block includes a first support surface to support the item, the first support surface including a first point and a second point spaced apart along the longitudinal direction and differing in distance relative to the first floor.

3. The vehicle storage assembly of claim 2, wherein the first block further includes a second support surface spaced from the first support surface along the longitudinal direction, the second support surface including a third point and a fourth point spaced apart along the longitudinal direction and differing in distance relative to the first floor.

4. The vehicle storage assembly of claim 1, wherein the first track contacts the first floor.

5. The vehicle storage assembly of claim 4, wherein the housing further includes a second floor and a second wall extending therefrom, the second floor and the second wall together defining a second cavity spaced from the first cavity along the depth direction.

6. The vehicle storage assembly of claim 5, further comprising a telescopic table at least partially received within the second cavity, such that the first block elevates and descends along the depth direction via connection to the telescopic table.

7. The vehicle storage assembly of claim 5, further comprising a locking unit to releasably lock the first block at a given position, the locking unit being at least partially received within the second cavity.

8. The vehicle storage assembly of claim 7, wherein the locking unit includes a first mating track, such that the first block is locked at the give position when the first track engages the first mating track.

9. The vehicle storage assembly of claim 1, further comprising a second track supported on and contacting the first wall, and a transverse bar contacting and movable relative to the second track to provide positioning of the item.

10. The vehicle storage assembly of claim 9, wherein the second track includes a first tracking part and a second tracking part contacting a first wall part and a second wall part of the first wall, respectively, such that the transverse bar contacts both the first tracking part and the second tracking part when positioning the item.

11. The vehicle storage assembly of claim 1, wherein the first cavity includes a first end portion and a second end portion spaced from the first end portion along the longitudinal direction, the first end portion differing from the second end portion in opening dimension.

12. The vehicle storage assembly of claim 1, wherein the first block includes a pair of first blocks spaced apart along the longitudinal direction and movable along the first track.

13. The vehicle storage assembly of claim 1, wherein the first track is supported on and contacts the first wall.

14. The vehicle storage assembly of claim 1, wherein the first track includes a first block pocket and a second block pocket spaced apart along the longitudinal direction and extending along the depth direction, such that the first block pocket and the second block pocket respectively correspond to the first block position and the second block position.

* * * * *